United States Patent
Chen et al.

(10) Patent No.: US 12,313,860 B2
(45) Date of Patent: May 27, 2025

(54) DEVICE AND METHOD FOR ELIMINATING STRAY LIGHT OF FRESNEL LENS, AND OPTICAL APPARATUS

(71) Applicant: BOE Technology Group Co., Ltd., Beijing (CN)

(72) Inventors: Lili Chen, Beijing (CN); Hao Zhang, Beijing (CN); Xue Dong, Beijing (CN); Ruijun Dong, Beijing (CN); Haitao Huang, Beijing (CN); Jiarong Bai, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/913,272

(22) PCT Filed: Nov. 23, 2021

(86) PCT No.: PCT/CN2021/132268
§ 371 (c)(1),
(2) Date: Sep. 21, 2022

(87) PCT Pub. No.: WO2023/092251
PCT Pub. Date: Jun. 1, 2023

(65) Prior Publication Data
US 2024/0210599 A1  Jun. 27, 2024

(51) Int. Cl.
*G02B 3/08* (2006.01)
*G02F 1/29* (2006.01)

(52) U.S. Cl.
CPC ............ *G02B 3/08* (2013.01); *G02F 1/29* (2013.01)

(58) Field of Classification Search
None
See application file for complete search history.

(56) References Cited

U.S. PATENT DOCUMENTS

| | | | | |
|---|---|---|---|---|
| 5,676,804 A | * | 10/1997 | Fujii | C23C 14/08 427/469 |
| 7,897,986 B2 | * | 3/2011 | Liu | G02B 3/0056 257/431 |
| 9,366,791 B2 | | 6/2016 | Iwata | |
| 9,521,404 B2 | | 12/2016 | Wu | |

(Continued)

FOREIGN PATENT DOCUMENTS

| CN | 102466905 A | 5/2012 |
|---|---|---|
| CN | 102645688 A | 8/2012 |

(Continued)

*Primary Examiner* — Ryan Crockett (57) ABSTRACT

Provided are a device and a method for eliminating a stray light of a Fresnel lens and an optical apparatus. The device for eliminating a stray light of a Fresnel lens includes: at least one Fresnel lens body, wherein each Fresnel lens body has a flat surface and a concave-convex surface that are arranged oppositely, the concave-convex surface is provided with a plurality of optical parts, and each of the optical parts is provided with an optically working surface and an optically invalid surface; and at least one electro-barrier provided with a plurality of pixels arranged in an array, wherein the plurality of pixels are controllable to be turned on or off by an electrical signal to form a blocking region, and the blocking region is configured to block the optically invalid surface.

8 Claims, 5 Drawing Sheets

(56) References Cited

U.S. PATENT DOCUMENTS

| | | | |
|---|---|---|---|
| 9,612,372 B2 | 4/2017 | Iwata | |
| 2006/0270179 A1* | 11/2006 | Yang | H01L 23/544 |
| | | | 438/455 |
| 2007/0201148 A1* | 8/2007 | Eckhardt | G02B 5/1876 |
| | | | 359/742 |
| 2011/0234929 A1* | 9/2011 | Lin | G02B 30/27 |
| | | | 349/15 |
| 2012/0212821 A1* | 8/2012 | Iwata | G02B 5/18 |
| | | | 359/569 |
| 2013/0201091 A1* | 8/2013 | Hung | G02B 30/27 |
| | | | 362/97.1 |
| 2013/0229587 A1* | 9/2013 | Takama | G02F 1/137 |
| | | | 349/138 |
| 2013/0257855 A1* | 10/2013 | Kim | G02B 30/27 |
| | | | 349/111 |
| 2014/0160567 A1 | 6/2014 | Iwata | |
| 2014/0198099 A1* | 7/2014 | Tseng | G02B 30/31 |
| | | | 345/419 |
| 2015/0319427 A1* | 11/2015 | Wu | H04N 13/315 |
| | | | 345/426 |
| 2016/0274372 A1* | 9/2016 | Tian | H04N 13/31 |
| 2016/0363781 A1* | 12/2016 | Wu | G02F 1/13394 |
| 2018/0149877 A1* | 5/2018 | Lu | H04N 13/315 |
| 2018/0372925 A1* | 12/2018 | Tada | F21V 5/045 |
| 2020/0183182 A1* | 6/2020 | Yang | H04N 13/376 |
| 2022/0236585 A1* | 7/2022 | Zhu | G02B 30/31 |

FOREIGN PATENT DOCUMENTS

| | | |
|---|---|---|
| CN | 103152594 A | 6/2013 |
| CN | 105892069 A | 8/2016 |
| CN | 110401829 A | 11/2019 |
| CN | 110531527 A | 12/2019 |
| CN | 113009758 A | 6/2021 |
| JP | 2000-081668 A | 3/2000 |
| JP | 2002-107834 A | 4/2002 |
| JP | 2002-268147 A | 9/2002 |

* cited by examiner

| S401: At least one electro-barrier is provided on a flat surface and/or a concave-convex surface of a Fresnel lens body, the flat surface and the concave-convex surface are oppositely arranged, the concave-convex surface is provided with a plurality of optical parts, each optical part is provided with an optically working surface and an optically invalid surface, and the electro-barrier is provided with a plurality of pixels arranged in an array |

↓

| S402: A plurality of pixels are turned on or off to form a blocking region under a control of an electrical signal, so that the blocking region blocks the optically invalid surface |

↓

| S403: At least one first alignment mark is formed on the Fresnel lens body; a plurality of pixels are turned on or off to form the blocking region and at least one second alignment mark on the electro-barrier; the second alignment mark is aligned with the first alignment mark, so that the blocking region blocks the optically invalid surface |

FIG. 4

DEVICE AND METHOD FOR ELIMINATING STRAY LIGHT OF FRESNEL LENS, AND OPTICAL APPARATUS

CROSS-REFERENCE TO RELATED APPLICATION

This application is a Section 371 National Stage Application of International Application No. PCT/CN2021/102386, filed on Jun. 25, 2021, entitled "DEVICE AND METHOD FOR ELIMINATING STRAY LIGHT OF FRESNEL LENS, AND OPTICAL APPARATUS".

TECHNICAL FIELD

The present disclosure relates to a field of lens technology, and in particular, to a device and a method for eliminating a stray light of a Fresnel lens, and an optical apparatus.

BACKGROUND

A Fresnel lens has a flat surface and a concave-convex surface arranged oppositely. The concave-convex surface is formed by machining concentric circles from small to large. The concave-convex surface has an optically working surface and an optically invalid surface. Theoretically, no transition surface exists between the optically working surface and the optically invalid surface, and a performance of light passing through the Fresnel lens may not be affected. However, in actual design, production, manufacturing and other processes, due to an influence of design, processing technology, material property, assembly method and other comprehensive factors, top and bottom angles between the optically working surface and the optically invalid surface may have transitional rounded corners, which may cause scattering of light passing through these parts, and affect a light transmission or imaging effect of the Fresnel lens. In addition, due to the influence of the assembly method or the like, the light transmission or imaging effect of the Fresnel lens may be further deteriorated.

The above information disclosed in this section is only for the understanding of the background of a technical concept of the present disclosure. Therefore, the above information may contain information that does not constitute a related art.

SUMMARY

In an aspect, a device for eliminating a stray light of a Fresnel lens is provided, including: at least one Fresnel lens body, wherein each Fresnel lens body has a flat surface and a concave-convex surface that are arranged oppositely, the concave-convex surface is provided with a plurality of optical parts, and each of the optical parts is provided with an optically working surface and an optically invalid surface: at least one electro-barrier provided with a plurality of pixels arranged in an array, wherein the plurality of pixels are controllable to be turned on or off by an electrical signal to form a blocking region, and the blocking region is configured to block the optically invalid surface.

In some exemplary embodiments, a projection of the optically invalid surface on the flat surface of the Fresnel lens body is located within a projection of the blocking region on the flat surface.

In some exemplary embodiments, a projection of a connection between the optically invalid surface and the optically working surface on the flat surface of the Fresnel lens body is located within the projection of the blocking region on the flat surface.

In some exemplary embodiments, the electro-barrier is arranged on the flat surface and/or the concave-convex surface.

In some exemplary embodiments, the Fresnel lens body is provided with at least one first alignment mark: when the blocking region is formed by the plurality of pixels, at least one second alignment mark is further formed by the plurality of pixels of the electro-barrier, and the second alignment mark is configured to be aligned with the first alignment mark so that the blocking region blocks the optically invalid surface.

In some exemplary embodiments, a shape of the second alignment mark and a shape of the blocking region formed by the plurality of pixels correspond to a shape of the first alignment mark and a shape of the optical part of the Fresnel lens body, respectively.

In some exemplary embodiments, positions of a plurality of pixels of the electro-barrier to be turned on or off are adjustable to translate the second alignment mark and the blocking region on the electro-barrier, so that the second alignment mark is aligned with the first alignment mark, and the blocking region completely blocks the optically invalid surface.

In some exemplary embodiments, when the plurality of pixels are turned on by an electrical signal, light is not allowed to pass through a region where the pixels of the electro-barrier are located.

In some exemplary embodiments, when the plurality of pixels are turned off by an electrical signal, light is not allowed to pass through a region where the pixels of the electro-barrier are located.

In another aspect, a method for eliminating a stray light of a Fresnel lens is provided, including: providing at least one electro-barrier on a flat surface and/or a concave-convex surface of a Fresnel lens body, wherein the flat surface and the concave-convex surface are arranged oppositely, the concave-convex surface is provided with a plurality of optical parts, each of the optical parts is provided with an optically working surface and an optically invalid surface, and the electro-barrier is provided with a plurality of pixels arranged in an array: and turning on or off the plurality of pixels by an electrical signal to form a blocking region so that the blocking region blocks the optically invalid surface.

In some exemplary embodiments, the method further includes: forming at least one first alignment mark on the Fresnel lens body: turning on or off the plurality of pixels to form the blocking region and at least one second alignment mark on the electro-barrier: and aligning the second alignment mark with the first alignment mark so that the blocking region blocks the optically invalid surface.

In some exemplary embodiments, a shape of the blocking region and a shape of the at least one second alignment mark formed by the plurality of pixels correspond to a shape of the optical part and a shape of the at least one first alignment mark of the Fresnel lens body, respectively: the aligning the second alignment mark with the first alignment mark so that the blocking region blocks the optically invalid surface includes: adjusting positions of a plurality of pixels of the electro-barrier to be turned on or off to translate the second alignment mark and the blocking region on the electro-barrier, so that the second alignment mark is aligned with the first alignment mark, and the blocking region completely blocks the optically invalid surface.

In another aspect, an optical apparatus including the device for eliminating a stray light of a Fresnel lens described above is provided.

BRIEF DESCRIPTION OF DRAWINGS

In order to illustrate the technical solutions in embodiments of the present disclosure more clearly, the drawings of embodiments will be briefly introduced below. It should be noted that the drawings described below only relate to some embodiments of the present disclosure, rather than a limitation to the present disclosure.

DETAILED DESCRIPTION

In order to make objectives, technical solutions and advantages of the present disclosure clearer, the technical solutions of embodiments of the present disclosure will be clearly and completely described below with reference to the drawings. Obviously, the described embodiments are only a part of embodiments of the present disclosure, rather than all embodiments. Based on the described embodiments of the present disclosure, all additional embodiments obtained by those ordinary skilled in the art without carrying out inventive effort fall within the scope of protection of the present disclosure.

It should be noted that, in the drawings, for clarity and/or description purposes, size and relative size of elements may be enlarged. Accordingly, the size and relative size of each element need not to be limited to those shown in the drawings. In the specification and drawings, the same or similar reference numerals indicate the same or similar components.

When an element is described as being "on", "connected to" or "coupled to" another element, the element may be directly on the other element, directly connected to the other element, or directly coupled to the other element, or an intermediate element may be provided. However, when an element is described as being "directly on". "directly connected to" or "directly coupled to" another element, no intermediate element is provided. Other terms and/or expressions used to describe a relationship between elements, such as "between" and "directly between". "adjacent to" and "directly adjacent to". "on" and "directly on", and so on, should be interpreted in a similar manner. In addition, the term "connection" may refer to a physical connection, an electrical connection, a communicative connection, and/or a fluid connection. In addition. X-axis. Y-axis and Z-axis are not limited to three axes of a rectangular coordinate system, and may be interpreted in a broader meaning. For example, the X-axis, the Y-axis and the Z-axis may be perpendicular to each other, or may represent different directions that are not perpendicular to each other. For the objective of the present disclosure. "at least one of X. Y or Z" and "at least one selected from a group consisting of X. Y and Z" may be interpreted as only X, only Y, only Z. or any combination of two or more of X, Y and Z, such as XYZ. XYY. YZ and ZZ. As used herein, the term "and/or" includes any and all combinations of one or more of the listed related items.

It should be noted that although the terms "first". "second", and so on may be used herein to describe various components, members, elements, regions, layers and/or parts, these components, members, elements, regions, layers and/or parts should not be limited by these terms. Rather, these terms are used to distinguish one component, member, element, region, layer and/or part from another. Therefore, for example, a first component, a first member, a first element, a first region, a first layer and/or a first part discussed below may be referred to as a second component, a second member, a second element, a second region, a second layer and/or a second part without departing from teachings of the present disclosure.

For ease of description, spatial relationship terms, such as "upper", "lower", "left", "right", may be used herein to describe a relationship between one element or feature and another element or feature as shown in the figure. It should be understood that the spatial relationship terms are intended to cover other different orientations of a device in use or operation in addition to the orientation described in the figure. For example, if the device in the figure is turned upside down, an element or feature described as "below" or "under" another element or feature will be oriented "above" or "on" the other element or feature.

In a related art, due to an influence of design, processing technology, material and assembly of the Fresnel lens and other factors, the Fresnel lens has a problem of a stray light. When the Fresnel lens is applied to a display apparatus such as VR, there may be smearing, glare and other phenomena, which result in a poor user experience. However, fabricating a mechanical barrier in front of the Fresnel lens to block an optically invalid surface of an optical part of the Fresnel lens to eliminate the stray light is costly and has a low precision because a precision of machining process is limited and different barriers need to be customized for Fresnel lenses of different dimensions. In addition, during an installation of the barrier, there may be a problem of misalignment, which may result in a failure of the Fresnel lens after installation.

In order to solve the above problems, the present disclosure provides a device for eliminating a stray light of a Fresnel lens. The device of the present disclosure may effectively eliminate the stray light of the Fresnel lens, and positions of pixels of the electro-barrier to be turned on or off may be adjusted for different Fresnel lenses to adjust an installation error of the barrier, which is convenient and efficient.

The device for eliminating a stray light of a Fresnel lens according to embodiments of the present disclosure will be described in detail below with reference to FIG. 1A to FIG. 3E.

Figure 1A:
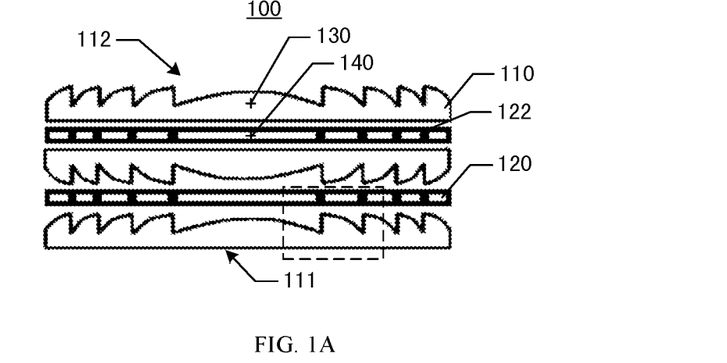
FIG. 1A shows a schematic cross-sectional structure diagram of a device for eliminating a stray light of a Fresnel lens according to exemplary embodiments of the present disclosure.
Figure 1B:
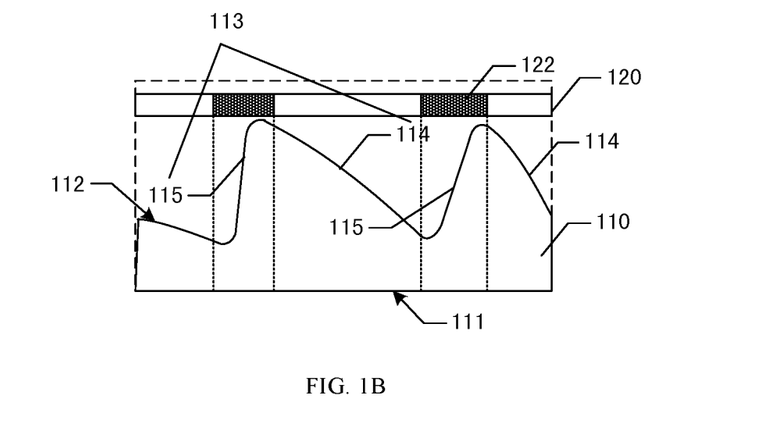
FIG. 1B shows a partial enlarged view of a device for eliminating a stray light of a Fresnel lens according to embodiments of the present disclosure.
Figure 2A:
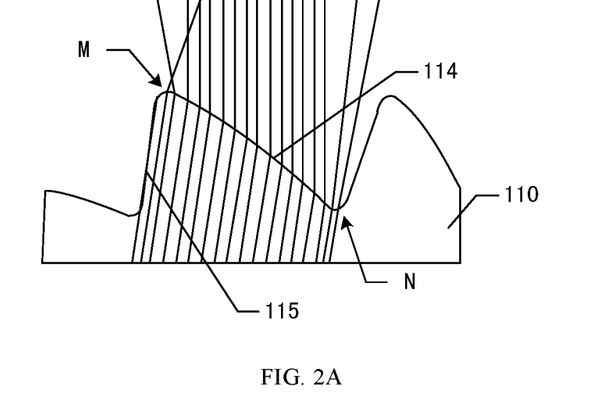
FIG. 2A shows a schematic diagram of a production of a stray light by an existing Fresnel lens.
Figure 2B:
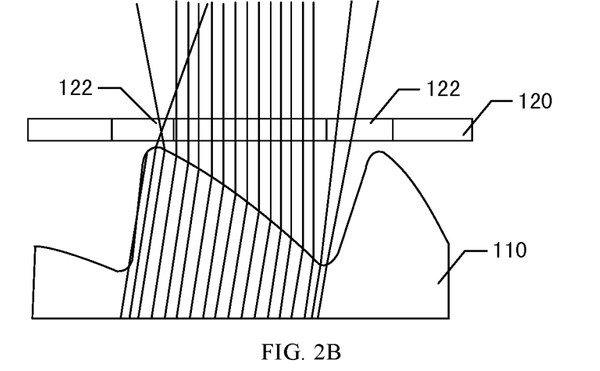
FIG. 2B shows a schematic diagram in which a blocking region of an electro-barrier of the device is turned off according to exemplary embodiments of the present disclosure.
Figure 2C:
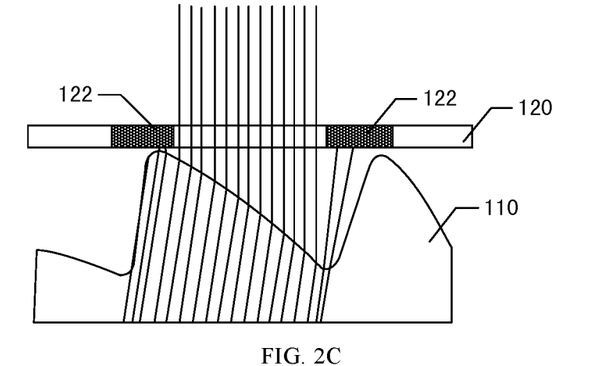
FIG. 2C shows a schematic diagram in which a blocking region of an electro-barrier of the device is turned on according to exemplary embodiments of the present disclosure.
Figure 3A:
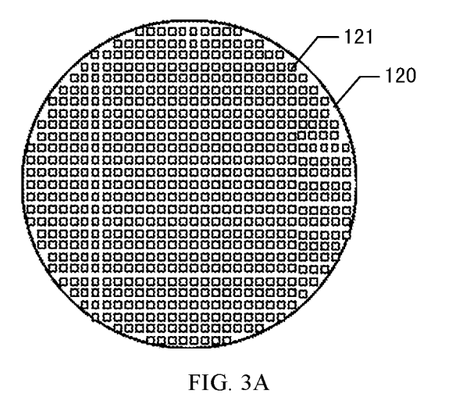
FIG. 3A shows a schematic diagram in which a plurality of pixels of an electro-barrier of the device are arranged in an array according to exemplary embodiments of the present disclosure.
Figure 3B:
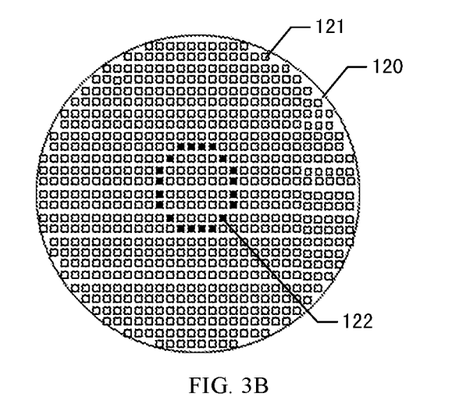
FIG. 3B shows a schematic diagram in which a plurality of pixels of an electro-barrier of the device form one blocking region according to exemplary embodiments of the present disclosure.
Figure 3C:
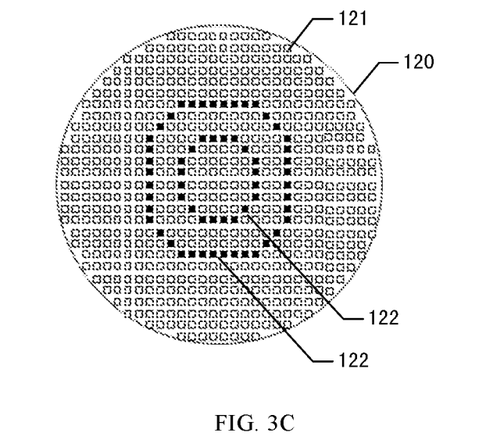
FIG. 3C shows a schematic diagram in which a plurality of pixels of an electro-barrier of the device form a plurality of blocking regions according to exemplary embodiments of the present disclosure.
Figure 3D:
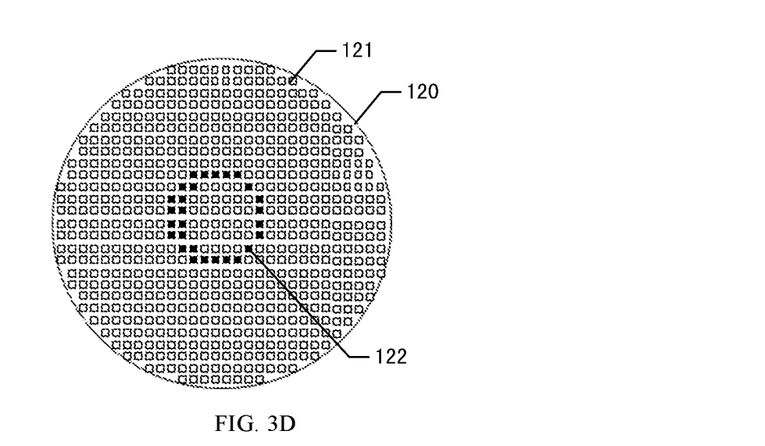
FIG. 3D shows a schematic diagram in which a plurality of pixels of an electro-barrier of the device form another blocking region according to exemplary embodiments of the present disclosure.
Figure 3E:
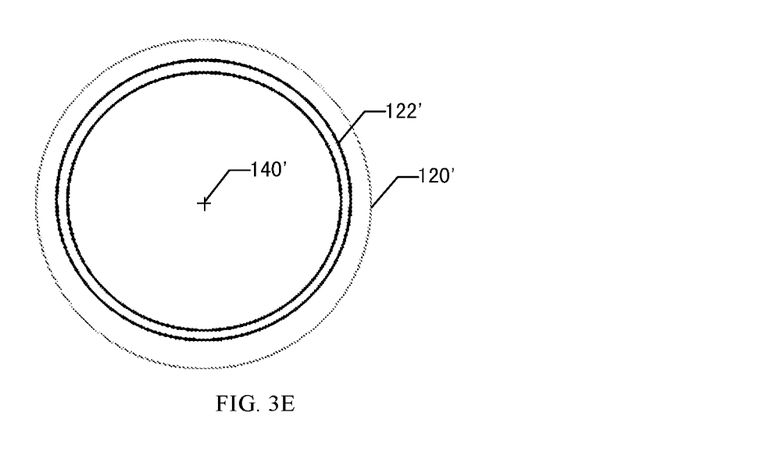
FIG. 3E shows a schematic diagram in which a plurality of pixels of an electro-barrier of the device form another blocking region according to another exemplary embodiment of the present disclosure.

FIG. 1A shows a schematic cross-sectional structure diagram of a device for eliminating a stray light of a Fresnel lens according to exemplary embodiments of the present disclosure. FIG. 1B shows a partial enlarged view of a device for eliminating a stray light of a Fresnel lens according to embodiments of the present disclosure. FIG. 2A shows a schematic diagram of a production of a stray light by an existing Fresnel lens. FIG. 2B shows a schematic diagram in which a blocking region of an electro-barrier of the device is turned off according to exemplary embodiments of the present disclosure. FIG. 2C shows a schematic diagram in which a blocking region of an electro-barrier of the device is turned on according to exemplary embodiments of the present disclosure. FIG. 3A shows a schematic diagram in which a plurality of pixels of an electro-barrier of the device are arranged in an array according to exemplary embodiments of the present disclosure. FIG. 3B shows a schematic diagram in which a plurality of pixels of an electro-barrier of the device form one blocking region according to exemplary embodiments of the present disclosure. FIG. 3C shows a schematic diagram in which a plurality of pixels of an electro-barrier of the device form a plurality of blocking regions according to exemplary embodiments of the present disclosure. FIG. 3D shows a schematic diagram in which a plurality of pixels of an electro-barrier of the device form another blocking region according to exemplary embodiments of the present disclosure. FIG. 3E shows a schematic diagram in which a plurality of pixels of an electro-barrier of the device form another blocking region according to another exemplary embodiment of the present disclosure.

As shown in FIG. 1A and FIG. 1B, a device 100 includes a Fresnel lens body 110 and an electro-barrier 120.

One or more Fresnel lens bodies 110 may be provided according to actual requirements. In this embodiment, for example, three Fresnel lens bodies 110 may be provided. In other optional embodiments, for example, two, four or other numbers of Fresnel lens bodies may be provided.

As shown in FIG. 1A and FIG. 1B, each Fresnel lens body has a flat surface 111 and a concave-convex surface 112 that are arranged oppositely. A plurality of optical parts 113 are arranged on the concave-convex surface 112. Each optical part 113 is provided with an optically working surface 114 and an optically invalid surface 115. The optical part 113 is used to refract light passing through the Fresnel lens, the optically working surface 114 is used to refract light, and the optically invalid surface 115 is used as a transition between the optically working surfaces 114 of different optical parts.

As shown in FIG. 1A, FIG. 3A and FIG. 3B, the electro-barrier 120 is provided with a plurality of pixels 121 arranged in an array. The plurality of pixels 121 may be controlled by a display control unit (not shown) so that different pixels 121 may be turned on or off. The plurality of pixels 121 may be controlled by an electrical signal sent by the display control unit, so as to be turned on or off to form a blocking region 122 (as shown in FIG. 3B). The blocking region 122 is used to block the optically invalid surface 115 and a connection between the optically invalid surface 115 and the optically working surface 114. A shape of the blocking region 122 may be adjusted and controlled by controlling a display position of the pixels 121. The electrical signal may be, for example, a voltage or a current.

In embodiments of the present disclosure, a size of the pixel 121 of the electro-barrier 120 may be in a nanometer or micrometer level, and a spacing between pixels is small, so as to ensure a good blocking effect when the pixels are in ON or OFF state.

For example, light may be blocked when the pixels of the electro-barrier are turned on. When the pixels are turned on by an electrical signal, light is not allowed to pass through a region where the pixels of the electro-barrier are located, so that light may be blocked. When the electrical signal does not pass through the pixels, the light may pass through the pixels of the electro-barrier. The pixels that need to be turned on may be controlled by the electrical signal, so as to determine a shape or a position of the blocking region of the electro-barrier.

For another example, light may be blocked when the pixels of the electro-barrier are turned off. When the electrical signal does not pass through the pixels, the pixels are in OFF state, and the light is not allowed to pass through the region where the pixels of the electro-barrier are located, so that the light is blocked. To allow the light to pass through the region where the pixels are located, it is needed to transmit the electrical signal to the pixels, so as some pixels are turned on to allow the light to pass, and other pixels that are not turned on may block the light.

In embodiments of the present disclosure, the pixel 121 of the electro-barrier 120 may be a rectangle, a square or may be of other shapes. In this embodiment, for example, a square is preferred, which may reduce the spacing between pixels and improve the blocking effect. The smaller the size of the pixel, the greater the adjustment accuracy of the blocking region, and the more accurate control is achieved.

In embodiments of the present disclosure, the pixels in the electro-barrier may be arranged in a regular pattern, such as a square, a rectangle, a rhombus, a parallelogram, a zigzag, a shape of "Hh", a honeycomb shape, etc., or in an irregular pattern, as long as the blocking region for blocking the optically invalid surface may be formed.

As shown in FIG. 2A, an existing Fresnel lens is prone to produce a stray light at a transitional position between the optically working surface 114 and the optically invalid surface 115. For example, the light may irradiate the flat surface of the Fresnel lens body, pass through the Fresnel lens body, and reach the optical part 113 on the concave-convex surface. The optical part 113 has the optically working surface 114 and the optically invalid surface 115. Due to the influence of processing technology or material property, there is a transition region at the connection between the optically working surface 114 and the optically invalid surface 115. The transition region presents a rounded corner or other shapes The rounded corner is formed in the process of actually manufacturing the Fresnel lens. In an ideal situation, the smaller the radius of the rounded corner, the better. That is, the rounded corner with a smaller radius may reduce the generation of stray light, thereby improving a light transmission or imaging effect of the Fresnel lens.

The light passing through the transition region may be scattered, as indicated by M and N shown in FIG. 2A. The scattered light is easy to interfere with other light and produce glare or other adverse effects.

As shown in FIG. 2B and FIG. 2C, the electro-barrier 120 is arranged close to the concave-convex surface of the Fresnel lens body 110, the pixels of the electro-barrier 120 are turned on under a control of an electrical signal to form a blocking region 122, and the blocking region blocks the optically invalid surface 115 and blocks the transition region between the optically invalid surface 115 and the optically working surface 114, so as to block the scattered light to eliminate the stray light of the Fresnel lens. As shown in FIG. 2B, when the plurality of pixels of the electro-barrier 120 that form the blocking region are turned off, light may pass through the blocking region, then the light is not affected by the electro-barrier 120. As shown in FIG. 2C, when a plurality of pixels of the electro-barrier 120 are turned on to form a blocking region, the light is not allowed to pass through the blocking region, then the electro-barrier 120 may block the light from the optically invalid surface and block the transition region between the optically invalid surface and the optically working surface, so as to eliminate the stray light.

In this embodiment, the electro-barrier 120 is preferably arranged on a side of the Fresnel lens body 110 close to the concave-convex surface 112, so as to better block the optically invalid surface 115 and the transition region between the optically invalid surface and the optically working surface.

In optional embodiments of the present disclosure, the electro-barrier may also be arranged on a side of the Fresnel lens body 110 close to the flat surface, or electro-barriers may be arranged on both the concave-convex surface and the flat surface of the Fresnel lens body, so as to achieve a better effect of eliminating the stray light.

For example, a first electro-barrier may be provided on the side of the Fresnel lens body close to the concave-convex surface, and a second electro-barrier may be provided on the side of the Fresnel lens body close to the flat surface. A blocking region of the first electro-barrier may block a part of the optically invalid surface and block the transition region between the optically invalid surface and the optically working surface. A blocking region of the second electro-barrier may block the transition region between the optically working surface and the optically invalid surface and block a part of the optically invalid surface.

As shown in FIG. 1B, a projection of the optically invalid surface 115 on the flat surface 111 of the Fresnel lens body 110 is located within a projection of the blocking region 122 on the flat surface 111. A projection of a connection between the optically invalid surface 115 and the optically working surface 114 on the flat surface 111 of the Fresnel lens body 110 is located within the projection of the blocking region 122 on the flat surface 111.

In this embodiment, after the blocking region is formed by controlling the turn-on or turn-off of the pixels, the projection of the optically invalid surface on the flat surface is located within the projection of the blocking region on the flat surface, so as to ensure that the formed blocking region may effectively block the optically invalid surface. For example, a width of the projection of the optically invalid surface 115 on the flat surface may be less than a width of the projection of the blocking region 122 on the flat surface. The blocking region 122 may not only block the optically invalid surface, but also block the transition region between the optically invalid surface 115 and the optically working surface 114, so as to eliminate the stray light produced by light passing through the Fresnel lens body and reaching the transition region.

In embodiments of the present disclosure, the Fresnel lens body is provided with at least one first alignment mark 130. When the blocking region 122 is formed by the plurality of pixels, at least one second alignment mark 140 is further formed by the plurality of pixels of the electro-barrier 120. The second alignment mark 140 is used to align with the first alignment mark 130, so that the blocking region 122 blocks the optically invalid surface 115.

As shown in FIG. 1A, the first alignment mark 130 may be arranged at a center of the Fresnel lens body 110, and the second alignment mark 140 may be arranged at a center of the electro-barrier 120. In a process of eliminating the stray light of the Fresnel lens body 110, after the second alignment mark 140 is aligned with the first alignment mark 130, the blocking region formed by the pixels may block the optically invalid surface.

In other optional embodiments, a plurality of first alignment marks may be provided, and a plurality of second alignment marks may be displayed, so that the blocking region may block the optically invalid surface more accurately, so as not to affect a transmission of normal light while eliminating the stray light.

As shown in FIG. 3A, different shapes may be displayed by controlling turn-on and turn-off of a plurality of pixels arranged in an array, so as to form blocking regions with different shapes to meet requirements of different Fresnel lenses for eliminating stray light.

In embodiments of the present disclosure, a shape of the second alignment mark 140 and a shape of the blocking region 122 formed by the plurality of pixels 121 of the electro-barrier 120 correspond to a shape of the first alignment mark 130 and a shape of the optical part 113 of the Fresnel lens body, respectively. The electro-barrier may be of any shape. For example, the electro-barrier may be of a same shape as the Fresnel lens body, or the electro-barrier may be of a different shape from the Fresnel lens body. An area occupied by the plurality of pixels of the electro-barrier is greater than or equal to an area of the Fresnel lens body, so that the optically invalid surface of the optical part of the Fresnel lens body may be blocked. For example, the shape of the electro-barrier may be designed according to the shape of the Fresnel lens body, which may be circular or irregular.

The shape of the second alignment mark 140 and the shape of the blocking region 122 formed by a plurality of pixels 121 of the electro-barrier 120 are set according to a size and a structure of the Fresnel lens body 110. For example, different blocking regions may be set for different sizes of Fresnel lens bodies and different structures of optical parts, so as to meet requirements of different Fresnel lens bodies for eliminating stray light.

For example, when manufacturing a Fresnel lens body, a processing parameter of the Fresnel lens body may be obtained, which may include an overall dimension of a Fresnel lens, a size of each optical part, a size of a projection of an optically working surface of each optical part on a flat surface, a size of a projection of an optically invalid surface of each optical part on the flat surface, and other parameters. A blocking region formed by turning on or turning off a plurality of pixels of the electro-barrier may be designed according to these parameters, so that the blocking region corresponds to a shape of the optical part of the Fresnel lens body, that is, the designed blocking region is aligned with the optically invalid surface of the optical part of the Fresnel lens body, so that the stray light of the Fresnel lens may be eliminated.

It is possible to design different positions of pixels of the electro-barrier to be turned on or turned off to form different block regions for different overall dimensions of Fresnel lenses, so as to meet requirements of different Fresnel lenses for eliminating stray light.

In embodiments of the present disclosure, when the electro-barrier is installed with the Fresnel lens body, there may be an accuracy problem caused by an installation method or a process. For example, the electro-barrier may be offset by a certain distance from the Fresnel lens body. By adjusting positions of a plurality of pixels of the electro-barrier to be turned on or turned off, the second alignment mark and the blocking region may be translated on the electro-barrier to make the second alignment mark aligned with the first alignment mark, so that the blocking region may completely block the optically invalid surface, and an installation error may be adjusted.

In a related art, if there is an installation error after a mechanical barrier is installed with a Fresnel lens body, the mechanical barrier needs to be removed and then re-installed. Due to an influence of an installation process, the error may not be completely eliminated, and the reinstallation requires more manpower and material resources, which is inefficient. In the present disclosure, even when there is a large error after the electro-barrier is installed, since the processing parameter of the Fresnel lens body does not change much, the blocking region may be translated by controlling positions of a plurality of pixels of the electro-barrier to be turned on or turned off, so as to adjust and eliminate the error.

For example, a first alignment mark may be provided at a center of the Fresnel lens body, and the first alignment mark and a size parameter of each optical part of the Fresnel lens body may be acquired. Positions of a plurality of pixels to be turned on or turned off may be designed on the electro-barrier according to the size parameter, so that a blocking region formed corresponds to a shape of the optical part of the Fresnel lens body. Then, a corresponding point at a center of the blocking region is displayed as a second alignment mark, and an alignment of the second alignment mark and the first alignment mark may be observed. If the second alignment mark and the first alignment mark are not aligned, it indicates that the blocking region does not completely block the optically invalid surface of the Fresnel lens body and the connection between the optically invalid surface and the optically working surface. By controlling a translation of the displayed blocking region on the electro-barrier, the position of the second alignment mark correspond to the first alignment mark may be adjusted. When the second alignment mark is aligned with the first alignment mark, it may be considered that the blocking region completely blocks the optically invalid surface and the connection between the optically invalid surface and the optically working surface, so that a purpose of eliminating the stray light may be achieved.

In embodiments of the present disclosure, as shown in FIG. 3C, as the Fresnel lens body is provided with a plurality of optical parts, a plurality of corresponding blocking regions need to be provided to block the optically invalid surfaces of the optical parts.

In a process of manufacturing a Fresnel lens, sizes of an optically invalid surface and an optically working surface of an optical part may not be completely consistent with theoretical sizes. When there is a difference between the sizes of the optically invalid surface and the optically working surface and the theoretical sizes, the barrier may block the optically invalid surface without completely eliminating the stray light, or the barrier may block the optically working surface to further affect a transmission of light.

For example, it is possible to adjust the blocking region by controlling one or more of the plurality of pixels of the electro-barrier. When the size of the optically invalid surface is larger than the theoretical size, on the basis of the blocking region designed based on the size of the Fresnel lens body, pixel(s) at a position where the designed size is different from an actual size may be adjusted according to the actual size. For example, pixel(s) at a position around the optically invalid surface with the larger size may be turned on or turned off to form a blocking region, so that the blocking region at this position is widened, as shown in FIG. 3D. In FIG. 3D, a left part of the blocking region is widened to achieve a better blocking effect.

In other optional embodiments, in a processing of manufacturing a Fresnel lens body, if the size of the optically invalid surface is less than the theoretical size, the blocking region may block the optically working surface too much, which may reduce a transmission of light. In this case, it is possible to control the pixel(s) at the corresponding position of the electro-barrier to be turned off or turned on to reduce the area of the blocking region, so as to better ensure the transmission of light while eliminating the stray light.

In other embodiments of the present disclosure, as shown in FIG. 3E, pixels of an electro-barrier 120' may also be arranged in a circular array: such as an annular array including a plurality of concentric circles. A second alignment mark 140' is provided at a center of the annular array, and the second alignment mark 140' is used for alignment with the first alignment mark provided at the center of the Fresnel lens body. The pixels of the annular array may be turned on or turned off to form a blocking region 122', so as to block the optically invalid surface of the optical part of the Fresnel lens body and eliminate the stray light of the Fresnel lens.

According to embodiments of the present disclosure, by providing the electro-barrier to form the blocking region by turning on or turning off the pixels under a control of an electrical signal, the position of the blocking region and an area blocked by the blocking region may be adjusted to better block the optically invalid surface of the Fresnel lens and effectively eliminate the stray light. In addition, the blocking region may be adjusted accurately by accurately controlling the turn-on and turn-off of the pixels, which may effectively eliminate errors produced in manufacturing, processing, installation and other processes, so that the stray light may be eliminated more efficiently.

Figure 4:
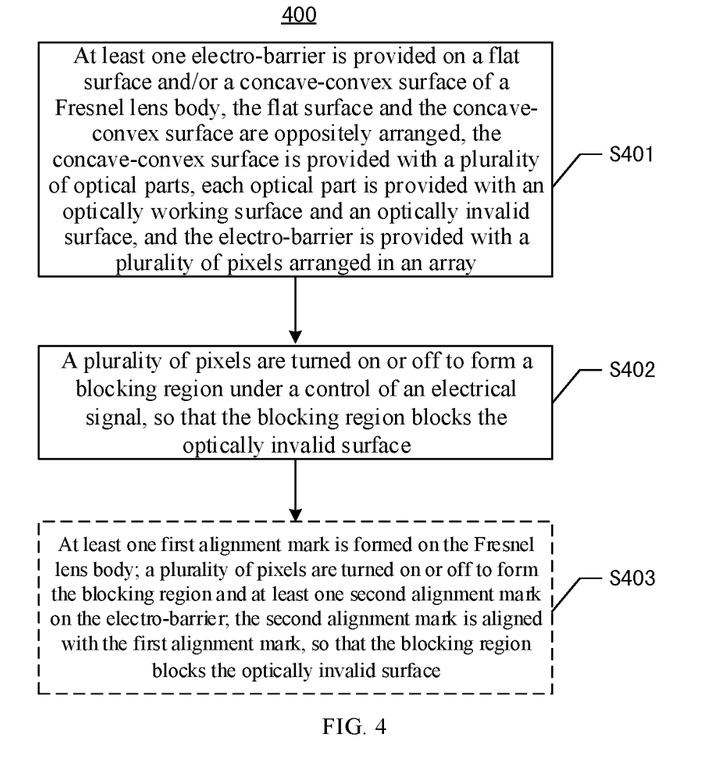
FIG. 4 shows a flowchart of a method for eliminating a stray light of a Fresnel lens according to exemplary embodiments of the present disclosure.

FIG. 4 shows a flowchart of a method for eliminating a stray light of a Fresnel lens according to exemplary embodiments of the present disclosure.

Another aspect of embodiments of the present disclosure provides a method for eliminating a stray light of a Fresnel lens. As shown in FIG. 4, a method 400 for eliminating a stray light of a Fresnel lens includes operations S401 to S402.

In operation S401, at least one electro-barrier is provided on a flat surface and/or a concave-convex surface of a Fresnel lens body. The flat surface and the concave-convex surface are oppositely arranged. The concave-convex surface is provided with a plurality of optical parts, and each optical part is provided with an optically working surface and an optically invalid surface. The electro-barrier is provided with a plurality of pixels arranged in an array.

Firstly, the electro-barrier is provided on the Fresnel lens body to block the light passing through the Fresnel lens.

In operation S402, a plurality of pixels are turned on or off to form a blocking region under a control of an electrical signal, so that the blocking region blocks the optically invalid surface.

The blocking region is formed to block the optically invalid surface by controlling the turn-on or turn-off of the pixels by the electrical signal, so that the stray light is eliminated.

The method for eliminating a stray light of a Fresnel lens further includes operation S403. In operation S403, at least one first alignment mark is formed on the Fresnel lens body: a plurality of pixels are turned on or off to form the blocking region and at least one second alignment mark on the electro-barrier: the second alignment mark is aligned with the first alignment mark, so that the blocking region blocks the optically invalid surface.

The first alignment mark is formed on the Fresnel lens body, the second alignment mark is formed on the electro-barrier, and the blocking region is adjusted to block the optically invalid surface by aligning the first alignment mark and the second alignment mark.

In embodiments of the present disclosure, the shape of the blocking region formed by a plurality of pixels and the shape of the at least one second alignment mark correspond to the shape of the optical part and the shape of the at least one first alignment mark of the Fresnel lens body, respectively: aligning the second alignment mark with the first alignment mark so that the blocking region blocks the optically invalid surface includes: adjusting positions of a plurality of pixels of the electro-barrier to be turned on or off, so that the second alignment mark and the blocking region are translated on the electro-barrier to align the second alignment mark with the first alignment mark, and the blocking region completely blocks the optically invalid surface.

By controlling the turn-on and turn-off of the plurality of pixels, the blocking region is translated on the electro-barrier, and the position blocked by the blocking region is adjusted.

In embodiments of the present disclosure, the method for eliminating the stray light of the Fresnel lens further includes adjusting positions of a plurality of pixels of the electro-barrier to be turned on or off, so as to increase or decrease an area of the blocking region at a position of the electro-barrier, so that a specific blocking region is adjusted, and a blocking effect of the blocking region is controlled more accurately.

Another aspect of embodiments of the present disclosure provides an optical apparatus, including the device for eliminating the stray light of the Fresnel lens described above. By providing the device for eliminating the stray light of the Fresnel lens in the optical apparatus, the stray light phenomenon in the optical apparatus may be effectively eliminated, and an overall display effect of the optical apparatus may be effectively improved. For example, the optical apparatus may include VR glasses, AR glasses, a head-up display (HUD), a projector, and the like.

The above are only some specific embodiments of the present disclosure, but the protection scope of the present disclosure is not limited thereto. All changes or substitutions that may be easily envisaged by those skilled in the art within the technical scope disclosed in the present disclosure should be covered by the scope of protection of the present disclosure. Therefore, the scope of protection of the present disclosure should be defined by the scope of protection of the claims.

What is claimed is:

1. A device for eliminating a stray light of a Fresnel lens, comprising:
   at least one Fresnel lens body, wherein each Fresnel lens body has a flat surface and a concave-convex surface that are arranged oppositely, the concave-convex surface is provided with a plurality of optical parts, and each of the optical parts is provided with an optically working surface and an optically invalid surface; and
   at least one electro-barrier provided with a plurality of pixels arranged in an array, wherein the plurality of pixels are controllable to be turned on or off by an electrical signal to form a blocking region, and the blocking region is configured to block the optically invalid surface,
   wherein the Fresnel lens body is provided with at least one first alignment mark,
   wherein when the blocking region is formed by the plurality of pixels, at least one second alignment mark is further formed by the plurality of pixels of the electro-barrier, and the second alignment mark is configured to be aligned with the first alignment mark so that the blocking region blocks the optically invalid surface,
   wherein a shape of the second alignment mark and a shape of the blocking region formed by the plurality of pixels correspond to a shape of the first alignment mark and a shape of the optical part of the Fresnel lens body, respectively, and
   wherein positions of a plurality of pixels of the electro-barrier to be turned on or off are adjustable to translate the second alignment mark and the blocking region on the electro-barrier and to adjust an area of the blocking region, so that the second alignment mark is aligned with the first alignment mark, and the blocking region completely blocks the optically invalid surface.

2. The device according to claim 1, wherein a projection of the optically invalid surface on the flat surface of the Fresnel lens body is located within a projection of the blocking region on the flat surface.

3. The device according to claim 2, wherein a projection of a connection between the optically invalid surface and the optically working surface on the flat surface of the Fresnel lens body is located within the projection of the blocking region on the flat surface.

4. The device according to claim 1, wherein the electro-barrier is arranged on the flat surface and/or the concave-convex surface.

5. The device according to claim 1, wherein when the plurality of pixels are turned on by an electrical signal, light is not allowed to pass through a region where the pixels of the electro-barrier are located.

6. The device according to claim 1, wherein when the plurality of pixels are turned off by an electrical signal, light is not allowed to pass through a region where the pixels of the electro-barrier are located.

7. An optical apparatus, comprising the device for eliminating a stray light of a Fresnel lens according to claim 1.

8. A method for eliminating a stray light of a Fresnel lens, comprising:
   providing at least one electro-barrier on a flat surface and/or a concave-convex surface of a Fresnel lens body, wherein the flat surface and the concave-convex surface are arranged oppositely, the concave-convex surface is provided with a plurality of optical parts, each of the optical parts is provided with an optically working surface and an optically invalid surface, and the electro-barrier is provided with a plurality of pixels arranged in an array; and turning on or off the plurality of pixels by an electrical signal to form a blocking region so that the blocking region blocks the optically invalid surface, wherein the method further comprises:
    forming at least one first alignment mark on the Fresnel lens body;
    turning on or off the plurality of pixels to form the blocking region and at least one second alignment mark on the electro-barrier; and
    aligning the second alignment mark with the first alignment mark so that the blocking region blocks the optically invalid surface, wherein a shape of the blocking region and a shape of the at least one second alignment mark formed by the plurality of pixels correspond to a shape of the optical part and a shape of the at least one first alignment mark of the Fresnel lens body, respectively, and wherein the aligning the second alignment mark with the first alignment mark so that the blocking region blocks the optically invalid surface comprises adjusting positions of a plurality of pixels of the electro-barrier to be turned on or off to translate the second alignment mark and the blocking region on the electro-barrier and to adjust an area of the blocking region, so that the second alignment mark is aligned with the first alignment mark, and the blocking region completely blocks the optically invalid surface.

* * * * *